United States Patent [19]

Pellicori et al.

[11] Patent Number: 5,541,770
[45] Date of Patent: Jul. 30, 1996

[54] LIGHT ATTENUATING ANTI-REFLECTION COATING INCLUDING ELECTRICALLY CONDUCTIVE LAYERS

[75] Inventors: Samuel F. Pellicori, Santa Barbara, Calif.; David E. Stevenson, Northfield, Minn.

[73] Assignee: Photran Corporation, Lakeville, Minn.

[21] Appl. No.: 316,037

[22] Filed: Sep. 30, 1994

Related U.S. Application Data

[63] Continuation of Ser. No. 20,340, Feb. 19, 1993, abandoned.
[51] Int. Cl.$^6$ .................................................. G02B 1/10
[52] U.S. Cl. .......................... 359/585; 359/586; 359/588
[58] Field of Search ..................................... 359/585, 586, 359/588, 589

[56] References Cited

U.S. PATENT DOCUMENTS

| | | | |
|---|---|---|---|
| 4,101,200 | 7/1978 | Daxinger | 350/166 |
| 4,856,019 | 8/1989 | Miyata et al. | 359/585 |
| 5,085,926 | 2/1992 | Iida et al. | 359/589 |
| 5,091,244 | 2/1992 | Bionard | 428/216 |
| 5,105,310 | 4/1992 | Dickey | 359/589 |
| 5,168,003 | 12/1992 | Proscia | 359/586 |

FOREIGN PATENT DOCUMENTS 9304993  3/1993  WIPO .................. C03C 17/34

Primary Examiner—Edward K. Look
Assistant Examiner—Mark Sgantzos
Attorney, Agent, or Firm—R. Russel Austin

[57] ABSTRACT

An anti-reflection coating includes a first layer of a transparent material having a low refractive index a second layer of an absorbing metal, a third layer of a material which may have a high or a low refractive index and a fourth layer of titanium nitride.

2 Claims, 3 Drawing Sheets

LIGHT ATTENUATING ANTI-REFLECTION COATING INCLUDING ELECTRICALLY CONDUCTIVE LAYERS

CROSS REFERENCE TO PRIOR APPLICATIONS

This application is a continuing application of application Ser. No. 08/020,340 filed Feb. 19, 1993, now abandoned.

BACKGROUND OF THE INVENTION

The present invention relates to glare-reducing coatings. It relates more particularly to electrically-conductive light-attenuating anti-reflection coatings suitable for glare-reducing filters for video display units.

Video display units (VDUs) are now a common feature of everyday life. They are used for example in the home, in schools, and in retail in stores, as well as in offices and laboratories. It is not unusual for workers, such as word processing personnel, telephone operators, airline reservation personnel, and software developers, to spend most of a working day reading from a video display unit.

There is increasing concern for potential health hazards resulting from prolonged operation of a video display unit. Potential hazards include obvious hazards such as eye strain which may result when a screen's visibility is reduced as by glare from room background illumination. There could also be less definable potential hazards which may result from by diffusing reflected light. In such a case, less attenuation would be necessary to reduce glare to acceptable levels than would be necessary for a screen having a specular reflecting surface. Reduced attenuation would provide higher transmission for an image on the VDU screen and thus a brighter image.

Additionally, independent of attenuation level, a glare reducing filter is more effective the lower the reflectivity of the surface of the filter which faces a VDU operator. There are certain lighting conditions where reflection from a filter having a reflectivity as low as 0.1 percent may be distracting to a VDU operator. Clearly there is a need for glare reducing filters having a wide attenuation range and having a reflectivity less than 0.1 percent. Preferably such filters should be effective in reducing reflection not only for light incident normally thereon, but also for light incident thereon at non-normal incidence.

SUMMARY OF THE INVENTION

The present invention is directed to an electrically-conductive, light-attenuating, anti-reflection coating. The coating comprises at least four-layers. A first (outermost) layer, substantially non-absorbing for visible light, has a refractive index between about 1.35 and 1.7 at a wavelength of about 520 nanometers (nm) and an optical thickness of about one quarter wavelength of visible light.

A second layer includes a material selected from the group consisting of chromium (Cr), cobalt (Co), iron (Fe), molybdenum (Mo), neodymium (Nd), niobium (Nb), nickel (Ni), palladium (Pd), platinum (Pt), tantalum (Ta), titanium (Ti), tungsten (W), vanadium exposure to electromagnetic radiation emanating from a VDU.

Several forms of glare-reducing filter have been developed to protect a VDU operator against the above-mentioned hazards. Filters have been constructed, for example, from fine conductive mesh for providing suppression of electromagnetic radiation. Such filters reduce glare by dispersing light which would otherwise be reflected by a VDU screen. The conductive mesh, however, tends to reduced the sharpness of images viewed through it, and can also cause distracting moire patterns by interfering with the raster pattern of a VDU display.

Optically more effective filters include an anti-reflection coating deposited on at least one surface of a light attenuating glass substrate. Light from a VDU image passes through the substrate only once, while light incident on and reflected from the screen must pass through the substrate twice and is thus preferentially attenuated.

U.S. Pat. No. 5,091,244 discloses a four-layer electrically-conductive light-attenuating anti-reflection coating wherein the light attenuating and electrical conduction properties are provided by two transition metal nitride layers such as titanium nitride (TIN). The nitride layers are separated by a dielectric layer and overcoated by a dielectric layer. Filters having a reflection for visible light as low as 0.10 percent and a sheet resistance less than two-hundred ohms per square ($\Omega$/sq.) are disclosed. The filters attenuate light by more than fifty percent.

There are glare-reducing filter applications for which light attenuation of less than fifty percent is preferable. For example, a VDU screen may be provided with an etched surface which significantly reduces glare (V), and zirconium (Zr). The second layer has a thickness between about 0.5 and 5.0 nm.

A third layer, substantially non-absorbing for visible light, has a refractive index between about 1.35 and 2.65 at a wavelength of about 520 nanometers and has an optical thicknesses less than about one-quarter wavelength of visible light.

A fourth layer includes titanium nitride and has a thickness between about 10.0 and 40.0 nm.

The above-described layers are numbered beginning with the layer furthest from a substrate on which the layers are deposited.

In one preferred embodiment, The four layer coating includes a first layer of silicon dioxide, a second layer of molybdenum having a thickness of about 1.0 nm, a third layer of titanium dioxide layer having an optical thickness of about 0.086 wavelength of visible light, and a fourth layer is a layer of titanium nitride having a thickness of about 11.0 nm.

Computations indicate that the layer system of the preferred embodiment may provide a photopic reflectivity of about 0.05 percent and a transmission of about sixty percent.

In another embodiment of the present invention the coating includes five layers. A first layer, substantially non-absorbing for visible light, has a refractive index between about 1.35 and 1.70 at a wavelength of about 520 nanometers and an optical thickness of about one-quarter wavelength of visible light.

A second layer includes a material selected from the group consisting of Cr, Co, Fe, Mo, Nd, Nb, Ni, Pd, Pt, Ta, Ti, W, V, and Zr. The second layer has a thickness between about 0.5 and 5.0 nm.

A third layer, substantially non-absorbing for visible light, has a refractive index between about 1.35 and 2.65 at a wavelength of about 520 nanometers and has an optical thicknesses less than about one-quarter wavelength of visible light.

A fourth layer includes titanium nitride and has a thickness between about 10.0 and 40.0 nm.

A fifth layer substantially non-absorbing for visible light, has a refractive index between about 1.46 and 2.65 at a wavelength of about 520 nanometers and has an optical thicknesses less than about one-quarter wavelength of visible light.

Coatings in accordance with the present invention are effective for light incident between zero and at least twenty degrees. It should be noted that transparent materials used for the first, third and fifth layers preferably have an extinction coefficient (k) less than about 0.1 at a wavelength of 520 nm.

BRIEF DESCRIPTION OF THE DRAWINGS

For a better understanding of the invention and embodiments thereof described below, reference may be made to the drawings in which.

DETAILED DESCRIPTION OF THE INVENTION

Figure 1:
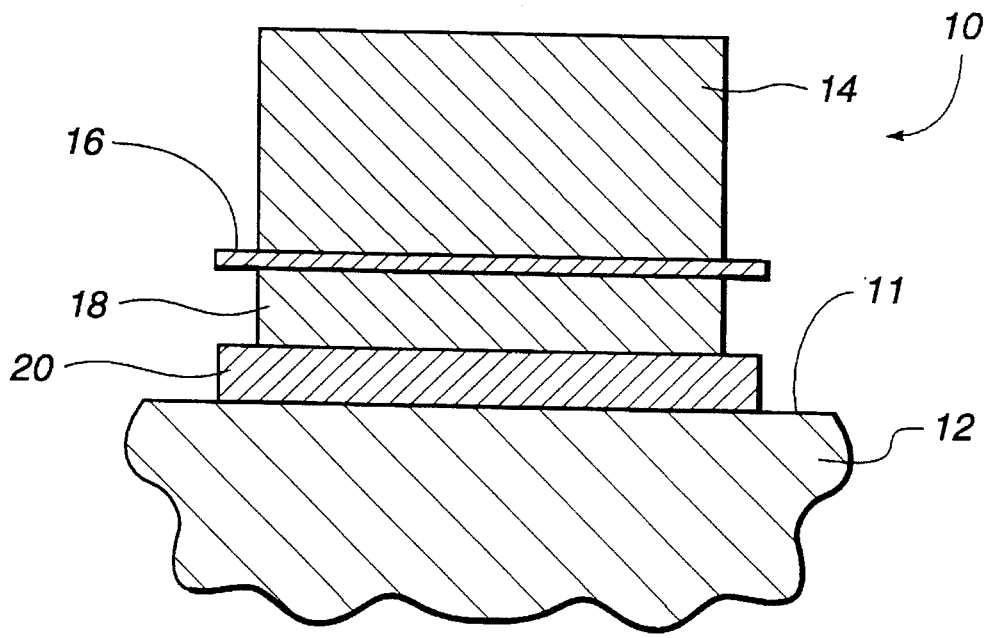
FIG. 1 is a schematic representation of the coating according to the present invention including four layers.

Before proceeding with a description of structural details and optical performance of the present invention, some terms and conventions used in the description will be defined.

Layers in a multilayer structure are numbered in sequence beginning with the outermost layer, i.e., the layer furthest from a surface on which the structure is deposited. Examples of multilayer structures described below are designed to be observed on a glass substrate and not through a glass substrate. As such, the layers are numbered in the order in which light is incident on them in their normal use. Those familiar with the pertinent art will be aware that coatings of the type described may have completely different reflection characteristics when viewed through a substrate on which they are deposited.

Layer thickness values are specified as either a physical thickness in nanometers (nm), or as an optical thickness as some fraction or multiple of a wavelength. For purposes of this description, a wavelength will be a wavelength of visible light, i.e., a wavelength in the range between about 425 and 675 nm. The optical thickness of a layer is the physical thickness of the layer multiplied by the refractive index of the layer.

Optical constants for TiN used for optical performance computation in the following description are estimated from a graphical representation of the optical constants of reactively sputtered TiN films in a paper "Optical and Electrical Properties of Thin TiN Layers", Szczyrbowski et al., Vakuum Technik, 37, 14–18,(1988). A table of values of the constants used in the computations is given in Table 1. Titanium Nitride may be conveniently deposited by DC reactive sputtering of metallic titanium in an atmosphere including nitrogen or ammonia. It is not intended, however, that TiN layers in the present invention be restricted to reactively sputtered layers, as such layers may also be deposited by other processes such as chemical vapor deposition.

TABLE 1

| Wavelength (nm) | n | k |
|---|---|---|
| 350 | 2.10 | 1.25 |
| 400 | 1.80 | 1.15 |
| 500 | 1.60 | 1.20 |
| 600 | 1.25 | 2.20 |
| 700 | 1.25 | 3.00 |
| 800 | 1.65 | 3.55 |

The term "transparent layers" refers to layers which have a sufficiently low value of extinction coefficient (k), for example, less than about 0.10, in the visible region of the electron magnetic spectrum, that they are substantially non-absorbing for visible light at thicknesses of about one-quarter wavelength or less of visible light. Such materials includes metal oxides, fluorides, oxyfluorides and the like. They are often referred to collectively as dielectric layers. The dielectric properties of such layers, however, may vary widely and, in fact, certain metal oxides such as indium oxide and tin oxide may be electrically conductive while still being substantially non-absorbing for visible light.

Transparent layers will be described as having either a low refractive index or a high refractive index. A low refractive index, in terms of the following description, means a refractive index less than about 1.7 Solid, low refractive index, transparent materials have a refractive index between about 1.35 and 1.7. A high refractive index, in terms of the following description means a refractive index higher than about 1.7. For solid materials transparent to visible light a practical range of high refractive index is between about 1.7 and 2.65.

In all examples in the following description it is assumed that layer systems or structures are deposited on a glass substrate having a refractive index of about 1.52. This is comparable with the refractive index of most common plate glasses. The present invention however is not limited to substrates having that specific refractive index. It will be evident to those familiar with the pertinent art that examples of the invention described below may be modified to accommodate a substrate having a refractive index higher or lower than 1.52.

Those familiar with the pertinent art will also be aware that any individual transparent layer in the design may be replaced with at least two thinner layers or sub-layers each thereof having a different refractive index. Together the sub-layers provide an optical equivalent of the layer, at least at one wavelength. Such multilayer substitutions are well known to practitioners of the art, and may be used for example to simulate a layer having a particular value of refractive index which is not provided by a known coating material.

Turning now to the drawings, wherein like components are designated by like identification numerals, the structure of a preferred embodiment of the present invention is shown in FIG. 1. Here, a coating 10 including a system of four layers is deposited on a surface 11 substrate 12. Four layer system 10 includes a first layer 14 of a material having a low refractive index and an optical thickness of about one-quarter wavelength. The refractive index of layer 14 is preferably lower than the refractive index of substrate 12.

A second layer 16 is a layer having a thickness between about 0.5 and 5 nanometers and including a metal preferably selected from the group consisting of Cr, Co, Fe, Mo, Nd, Nb, Ni, Pd, Pt, Ta, Ti, W, V, and Zr. These metals may be characterized as a group, for purposes of this description, as absorbing metals. Optical absorption for visible light in these metals is sufficiently high that even a layer sufficiently thick that transmission of visible light through the layer is essentially zero, still has a relatively low reflection throughout the visible spectrum, Light which is not reflected by the layer is absorbed. Maximum visible light reflectivity for the above specified group of metals ranges from about fifty to seventy percent (absorption from fifty to thirty percent) for visible light.

From examples given below it will be evident to those familiar with the pertinent art that other metals or alloys not specifically listed but having a maximum visible light reflectivity falling in the above-described range may be effective in layer structures of the present invention.

A third layer 18 is a layer of a transparent material which may have either a high refractive index or a low refractive index, i.e., layer 18 may have a refractive index between about 1.35 and 2.65. Generally, when layer 16 has relatively high values of n and k, for example between about 3.0 and 5.0, layer 18 preferably has a high refractive index. Third layer 18 has a refractive index less than about one-quarter wavelength of visible light.

A fourth layer 20 is a layer of titanium nitride having a thickness between about 10 and 40 nanometers. Computed examples of four layer structures according to the present invention are set forth in the following paragraphs.

Referring now to Table 2, first layer 14 is a layer of silicon dioxide having a refractive index (n) of about 1.46 at a wavelength of about 520 nm. Second layer 16 is a layer of molybdenum having a thickness of about 1 nm. Third layer 18 is a layer of titanium dioxide having a refractive index of about 2.35 at a wavelength of about 520 nm. Fourth layer 20 is a layer of titanium nitride having optical constants according to Table 1.

The layer thicknesses of Table 2 were determined using thin film computation software available from The Thin Film Center, of Tucson, Ariz. The software includes generally accepted values of refractive index for a range of transparent materials, and for certain absorbing metals, for example, chromium and tungsten. Optical constants of other absorbing metals may be found in *American Institute of Physics Handbook*, 3rd Edition, McGraw-Hill, 1982, pp 6–124—6–125. The software has a capability to refine or optimize layer thicknesses in a layer system, such that the system produces an optical performance as close as possible to a desired performance goal. In the example of Table 2, and other examples given below, the layer system was refined to provide the lowest possible reflection (a desired value of zero) at wavelengths between 425 nm and 675 nm. Starting layer thicknesses for first third and fourth layers 14, 18 and 20 were selected at random within the general specification of the layer system of FIG. 1 discussed above. Thickness of second layer 16 was fixed at 1.0 nm during the refinement process.

TABLE 2

| Layer No. | Material | Thickness (nm) |
|---|---|---|
| Medium | Air | |
| 1 | SiO$_2$ | 82.0 |
| 2 | Mo | 1.0 |
| 3 | TiO$_2$ | 19.0 |

TABLE 2-continued

| Layer No. | Material | Thickness (nm) |
|---|---|---|
| 4 | TiN | 10.9 |
| Substrate | Glass | |

Computed optical performance of the layer system of Table 2 is shown in Table 3. It can be seen from Table 3, that throughout most of the visible spectrum the layer system of Table 2 provides a reflection of less than 0.1 percent and a transmission greater than about percent. Average reflection for the layer system of Table 2.

TABLE 3

| Wavelength (nm) | Reflection (Percent) | Transmission (Percent) |
|---|---|---|
| 450 | 0.280 | 61.28 |
| 475 | 0.082 | 61.88 |
| 500 | 0.076 | 62.38 |
| 525 | 0.040 | 60.62 |
| 550 | 0.034 | 59.39 |
| 575 | 0.031 | 58.61 |
| 600 | 0.026 | 58.16 |
| 625 | 0.001 | 57.26 |
| 650 | 0.014 | 56.43 |
| 675 | 0.078 | 55.68 | is about 0.04 percent or less, i.e. less than half of the value obtained with prior art four layer systems including two titanium nitride films. Further, this extremely low reflection value is obtained together with a photopic transmission of about 58.0 percent or greater.

Turning now to Table 4, an example of the layer system 10 is shown wherein first layer 14 is a layer of SiO$_2$. Second layer 16 is a layer of tungsten having a thickness of about 2.5 nm. Third layer 18 is a layer of indium tin oxide (ITO). Fourth layer 20 is a layer of TiN having optical constants according to Table 1.

Performance of the layer system of Table 4 is shown in Table 5. The layer system of Table 4 has an average reflection of about 0.08 percent and an average transmission of about 50.0 percent.

TABLE 4

| Layer No | Material | Thickness (nm) |
|---|---|---|
| Medium | Air | |
| 1 | SiO$_2$ | 78.2 |
| 2 | W | 2.5 |
| 3 | ITO | 28.0 |
| 4 | TiN | 11.7 |
| Substrate | Glass | |

TABLE 5

| Wavelength (nm) | Transmission (Percent) | Reflection (Percent) |
|---|---|---|
| 450 | 0.125 | 53.09 |
| 475 | 0.009 | 53.71 |
| 500 | 0.044 | 54.22 |
| 525 | 0.075 | 51.81 |
| 550 | 0.103 | 49.91 |
| 575 | 0.095 | 48.58 |
| 600 | 0.068 | 47.72 |
| 625 | 0.012 | 46.79 |

TABLE 5-continued

| Wavelength (nm) | Transmission (Percent) | Reflection (Percent) |
| --- | --- | --- |
| 650 | 0.004 | 46.15 |
| 675 | 0.060 | 45.57 |

Continuing now with reference to Table 6, an example of the layer system 10 is shown wherein first layer 14 is a layer of aluminum oxide ($Al_2O_3$) having a refractive index of about 1.67 at a wavelength of about 520 nm. Second layer 16 is a layer of chromium having a thickness of about 2.6 nm. Third layer 18 is a layer of $TiO_2$. Fourth layer 20 is a layer of TiN having optical constants according to Table 1. First layer 14 has a refractive index higher than the refractive index of substrate 12. It is generally believed that this will not produce an optimum anti-reflection coating. It may be desirable, however, from a process standpoint, for example, for ease of depositing the layer by reactive sputtering, to use a material such as aluminum oxide, or some other material which has a higher refractive index than the refractive index of substrate 12.

TABLE 6

| Layer No. | Material | Thickness (nm) |
| --- | --- | --- |
| Medium | Air | |
| 1 | $Al_2O_3$ | 60 |
| 2 | Cr | 2.6 |
| 3 | $TiO_2$ | 20.0 |
| 4 | TiN | 20.0 |
| Substrate | Glass | |

The computed performance of the layer system of Table 6 is shown in Table 7. The average reflectivity of the layer system is about 0.12 percent and the photopic transmission is about 39.0 percent.

TABLE 7

| Wavelength (nm) | Reflection (Percent) | Transmission (Percent) |
| --- | --- | --- |
| 450 | 0.240 | 40.19 |
| 475 | 0.173 | 40.32 |
| 500 | 0.340 | 40.39 |
| 525 | 0.193 | 39.18 |
| 550 | 0.125 | 38.60 |
| 575 | 0.082 | 38.54 |
| 600 | 0.062 | 38.94 |
| 625 | 0.042 | 39.34 |
| 650 | 0.046 | 39.90 |
| 675 | 0.128 | 40.61 |

The reflection value is very low for an anti-reflection coating wherein the first layer has a refractive index higher than the refractive index of the substrate on which it is deposited. It is less than half of the reflection value of prior art conductive light-attenuating anti-reflection coatings including a first layer of $Al_2O_3$.

Figure 2:
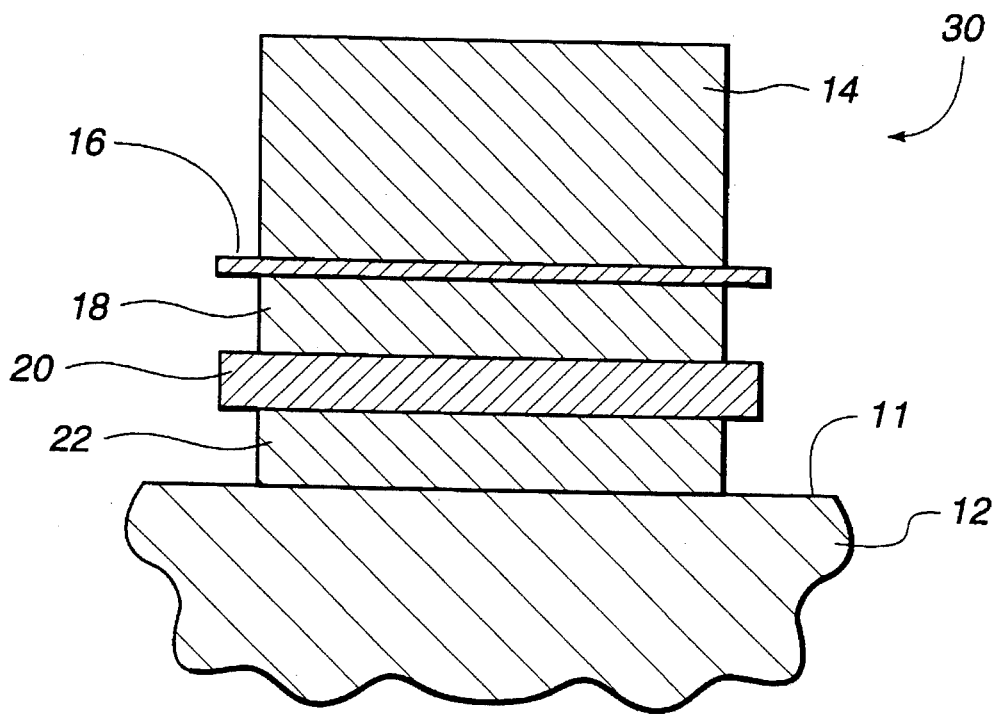
FIG. 2 is a schematic representation of an embodiment of the present invention including five layers.

Turning now to FIG. 2, another embodiment of the present invention is illustrated. Here, a coating 30 including a system of five layers is deposited on surface 11 of substrate 12. Layer system 30 includes a first layer 14 of a material having a low refractive index and an optical thickness of about one-quarter wavelength. The refractive index of layer 14 is preferably lower than the refractive index of substrate 12. A second layer 16 is a layer having a thickness between about 0.5 and 5 nanometers and including a metal preferably selected from the group consisting of Cr, Co, Fe, Mo, Nd, Nb, Ni, Pd, Pt, Ta, T, W, V, and Zr.

A third layer 18 is a layer of a transparent material having a refractive index between about 1.35 and 2.65 and an optical thickness less than about one-quarter wavelength of visible light. A fourth layer 20 is a layer of titanium nitride having a thickness between about 10 and 40 nanometers.

A fifth layer 22 is layer of a transparent material having a refractive index greater than the refractive index of substrate 12 and an optical thickness less than about one-quarter wavelength of visible light. Considering limitations of practically available transparent layer materials and substrate materials, layer 22 may have a refractive index between about 1.46 and 2.65 at a wavelength of about 520 nm.

Referring now to Table 8, details of an embodiment of layer system. 30 is shown wherein first layer 14 is a layer of $SiO_2$; second layer 16 is a layer of tungsten having a thickness of about 1.0 nm; third layer 18 is a layer of $TiO_2$; fourth layer 20 is a layer of TiN having optical constants according to Table 1; and fifth layer 22 is a layer of ITO.

The optical performance of the layer system of Table 8 is shown in Table 9. The photopic reflection of the layer system of Table 9 is about 0.08 percent and the photopic transmission is about 58.0 percent.

TABLE 8

| Layer No. | Material | Thickness (nm) |
| --- | --- | --- |
| Medium | Air | |
| 1 | $SiO_2$ | 72.0 |
| 2 | W | 1.0 |
| 3 | $TiO_2$ | 27.8 |
| 4 | TiN | 15.3 |
| 5 | ITO | 33.4 |
| Substrate | Glass | |

TABLE 9

| Wavelength (nm) | Reflection (Percent) | Transmission (Percent) |
| --- | --- | --- |
| 450 | 0.302 | 62.95 |
| 475 | 0.037 | 63.39 |
| 500 | 0.029 | 63.64 |
| 525 | 0.056 | 60.85 |
| 550 | 0.085 | 58.62 |
| 575 | 0.101 | 56.80 |
| 600 | 0.088 | 55.46 |
| 625 | 0.023 | 53.86 |
| 650 | 0.004 | 52.48 |
| 675 | 0.074 | 51.24 |

In Table 10, details of an embodiment of layer system 30 are shown wherein first layer 14 is a layer of $SiO_2$; second layer 16 is a layer of tungsten having a thickness of about 2.5 nm; third layer 18 is a layer of $TiO_2$; fourth layer 20 is a layer of TiN having optical constants according to Table 1; and fifth layer 22 is a layer of ITO.

The photopic reflection of the layer system of Table 10 is about 0.05 and the photopic transmission is about 40.0. Comparing this performance with the performance of the layer system of Table 8, it can be seen that by increasing the tungsten layer thickness from 1.0 nm to 3.0 nm, a reduction in reflection from about 0.08 percent to about 0.05 percent, i.e., almost a factor of two reduction, is obtained, accompanied by a loss in photopic transmission of about 10.0 percent.

In all of the foregoing examples, the minimum thickness of TiN in a layer system is greater than about 10.0 nm. Based on conductivity values for TiN disclosed in the above-referenced Szczyrbowski paper, it can be expected that conductive anti-reflection coatings in accordance with the present invention are capable of providing a minimum sheet resistance of about five-hundred ohms per square.

TABLE 10

| Layer No. | Material | Thickness (nm) |
|---|---|---|
|  | Air |  |
| 1 | SiO$_2$ | 77.7 |
| 2 | W | 3.0 |
| 3 | TiO$_2$ | 30.8 |
| 4 | TiN | 20.1 |
| 5 | ITO | 31.7 |
|  | Glass |  |

TABLE 11

| Wavelength (nm) | Reflection (Percent) | Transmission (Percent) |
|---|---|---|
| 450 | 0.067 | 45.16 |
| 475 | 0.016 | 45.67 |
| 500 | 0.018 | 46.16 |
| 525 | 0.024 | 43.08 |
| 550 | 0.057 | 40.53 |
| 575 | 0.088 | 38.44 |
| 600 | 0.097 | 36.80 |
| 625 | 0.029 | 35.26 |
| 650 | 0.001 | 34.04 |
| 675 | 0.053 | 32.95 |

By using layer systems with TiN layers 20.0 nm or greater in thickness, together with one or more transparent layers of a transparent conductor such as ITO, sheet resistance of about two-hundred ohms per square may be realized in a coating having a reflectivity less than 0.1 percent.

Reflection versus wavelength data contained in Tables 3, 5, 7, 9, and 11 are presented for light incident at normal incidence on coatings. As discussed above, however, it important that reflection reducing properties of an anti-glare filter not be significantly degraded when light is incident thereon at angles greater than normal incidence. Coatings in accordance with the present invention are quite effective in this regard.

Figure 3:
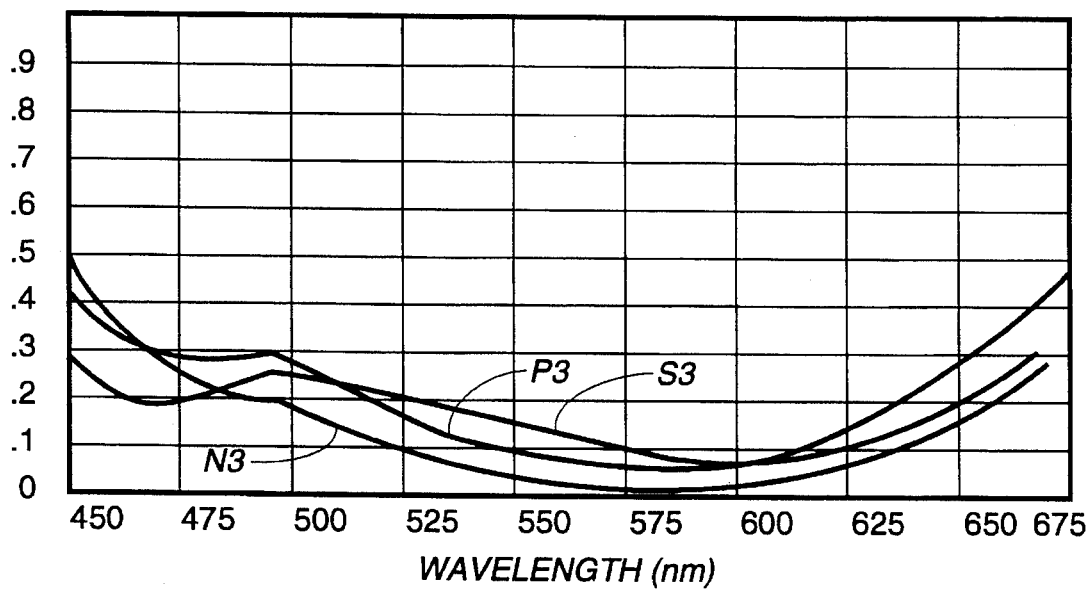
FIG. 3 graphically depicts reflectance as a function of wavelength for light incident at zero and twenty degrees incidence on one example of the four-layer coating of FIG. 1.
Figure 4:
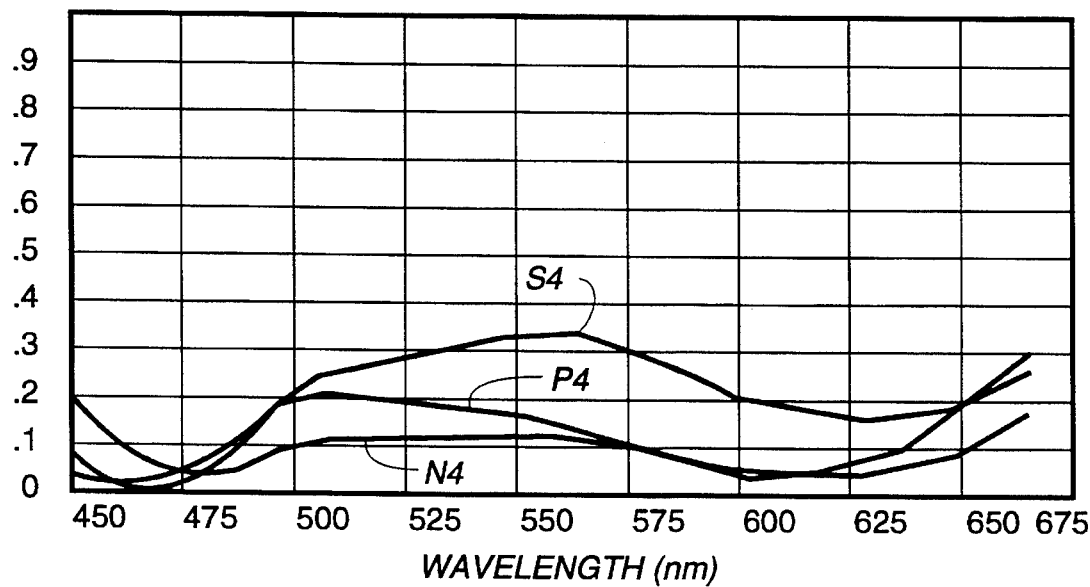
FIG. 4 graphically depicts reflectance as a function of wavelength for light incident at zero and twenty degrees incidence on one embodiment of the five-layer coating of FIG. 2.
Figure 5:
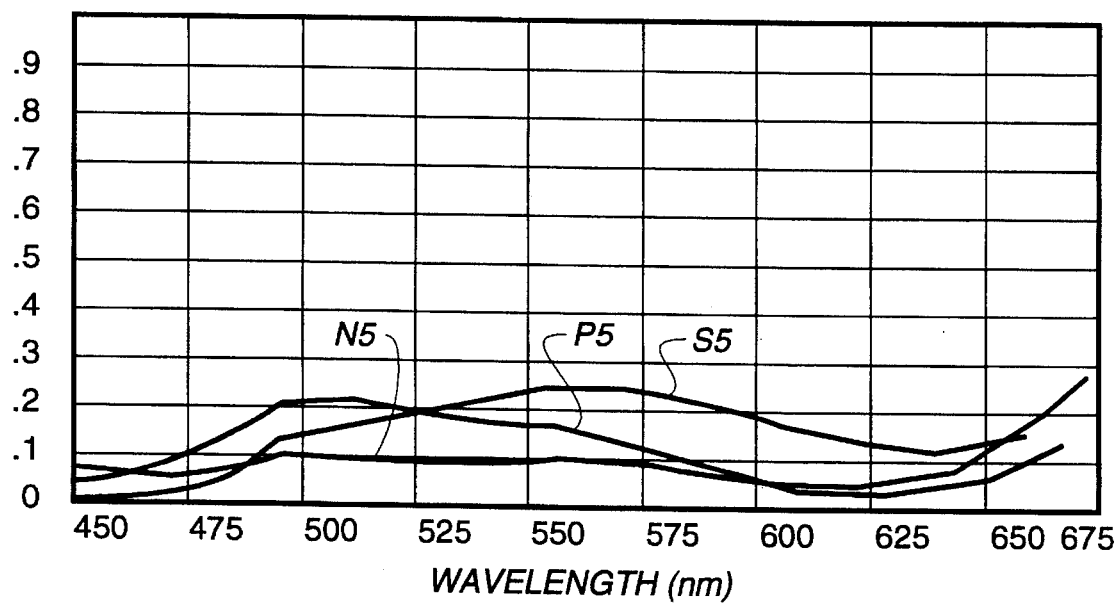
FIG. 5 graphically depicts reflectance as a function of wavelength for light incident at zero and twenty degrees incidence for another embodiment of the five-layer coating of FIG. 2.

By way of example, FIG. 3, FIG. 4, and FIG. 5 schematically illustrate reflection as a function of wavelength at zero and twenty degrees incidence for the layer systems of Table 2, Table 8, and Table 10 respectively.

FIGS. 3, 4, and 5 include: curves N3, N4, and N5 respectively, represent performance of the coatings at normal incidence; curves P3, P4, and P5 respectively represent performance of the coatings at twenty degrees incidence for "p" polarized light; and curves S3, S4, and S5 respectively represent performance of the coatings at twenty degrees incidence for "s" polarized light.

It can be seen from FIG. 3, that for a preferred four-layer embodiment of the coating of the present invention, reflectance is only increased by about 0.1 percent or less for light incident at about twenty degrees. The coatings of Table 8 and 10, however (FIGS. 3 and 4), while effective at normal incidence effective over a broader wavelength region than the coating of Table 2 have reflectance somewhat more degraded at twenty degrees incidence. Nevertheless, even the worst degradation (see FIG. 4) is not sufficient to raise the average-polarization reflection, i.e the average of the "p" and "s" state polarization reflection, above about 0.25 percent.

In summary a conductive, light-attenuating, anti-reflection coating suitable for an anti-glare filter for a VDU has been described. The coating includes a partially transmitting layer of titanium nitride and a partially transmitting layer of an absorbing metal separated by a layer of a transparent material. The metal and nitride layers are separated by a layer having a refractive index between about 1.35 and 2.65 forming a three layer group. The three layer group is overcoated with a layer of a transparent material having a refractive index between about 1.35 and 1.7. Computed values of average reflectivity as low as 0.04 percent have been obtained. These reflectivity values are less that half of the values reported for prior art electrically-conductive light-attenuating antireflection coatings and may be achieved without excessively attenuating light transmitted therethrough.

while the present invention has been described in terms of a preferred embodiment and a number of other embodiments, it is to be understood that various other changes and modifications could be made therein, by one skilled in the art, without varying from the spirit and scope of the present invention as defined by the appended claims.

What is claimed is:

1. An anti-reflection coating for a substrate, comprising:

at least first second third and fourth layers, said layers numbered in consecutive numerical order beginning with the layer furthest from the substrate;

said first layer including a having a refractive index between about 1.35 and 1.7 and an extinction coefficient less than about 0.1 at a wavelength of about 520 nanometers, said first layer having an optical thickness of about one-quarter wavelength of visible light;

said second layer being a layer of chromium having a thickness between about 0.5 and 5.0 nanometers;

said third layer including a material having a refractive index between about 1.35 and 2.65 and an extinction coefficient less than about 0.1 at a wavelength of about 520 nanometers, said third layer having an optical thickness less than about one-quarter wavelength of visible light; and said fourth layer including titanium nitride and having a thickness between about 10.0 and 40.0 nanometers.

2. An anti-reflection coating for a substrate, comprising:

at least first second third and fourth layers, said layers numbered in consecutive numerical order beginning with the layer furthest from the substrate;

said first layer having a refractive index between about 1.35 and 1.7 and an extinction coefficient less than about 0.1 at a wavelength of about 520 nanometers, said first layer having an optical thickness of about one-quarter wavelength of visible light;

said second layer being a layer of molybdenum having a thickness between about 0.5 and 5.0 nanometers;

said third layer including a material having a refractive index between about 1.35 and 2.65 and an extinction coefficient less than about 0.1 at a wavelength of about 520 nanometers, said third layer having an optical thickness less than about one-quarter wavelength of visible light; and said fourth layer including titanium nitride and having a thickness between about 10.0 and 40.0 nanometers.

* * * * *